US010178331B2

(12) United States Patent
Seliuchenko

(10) Patent No.: US 10,178,331 B2
(45) Date of Patent: Jan. 8, 2019

(54) METHOD FOR IMAGE NOISE REDUCTION AND IMAGE DEVICE

(71) Applicant: MELEXIS TECHNOLOGIES NV, Tessenderlo (BE)

(72) Inventor: Volodymyr Seliuchenko, Nashua, NH (US)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 257 days.

(21) Appl. No.: 15/101,051

(22) PCT Filed: Dec. 2, 2014

(86) PCT No.: PCT/EP2014/076283
§ 371 (c)(1),
(2) Date: Jun. 2, 2016

(87) PCT Pub. No.: WO2015/082484
PCT Pub. Date: Jun. 11, 2015

(65) Prior Publication Data
US 2016/0301884 A1 Oct. 13, 2016

(30) Foreign Application Priority Data
Dec. 2, 2013 (EP) ..................................... 13195391

(51) Int. Cl.
*H04N 5/365* (2011.01)
*H04N 5/378* (2011.01)
(Continued)

(52) U.S. Cl.
CPC ............. *H04N 5/365* (2013.01); *H04N 5/355* (2013.01); *H04N 5/3575* (2013.01);
(Continued)

(58) Field of Classification Search
CPC ........... H04N 5/35527; H04N 5/35518; H04N 5/3559
See application file for complete search history.

(56) References Cited

U.S. PATENT DOCUMENTS 6,927,796 B2 8/2005 Liu et al.
7,586,523 B2 9/2009 Egawa et al.
(Continued)

FOREIGN PATENT DOCUMENTS

EP 1924085 A2 5/2008
WO 2009131190 A1 10/2009

OTHER PUBLICATIONS

Decker et al., "A 256×256 CMOS Imaging Array with Wide Dynamic Range Pixels and Column-Parallel Digital Output," IEEE Journal of Solid-State Circuits, Dec. 1998, pp. 2081-2091, vol. 33, No. 12.
(Continued)

*Primary Examiner* — Nelson D. Hernández Hernández
(74) *Attorney, Agent, or Firm* — Workman Nydegger

(57) ABSTRACT

A method for noise reduction in an imaging device comprises a 4T pixel in operation, whereby the 4T pixel comprises a pinned photodiode and a floating diffusion node. The method includes the steps of: detecting a signal impinging on the 4T pixel of the imaging device and integrating the charge of the detected signal simultaneously in the photodiode potential well and the potential well of the floating diffusion node; deriving a linear signal proportional to the detected signal from the charge in the photodiode potential well; deriving a compressed signal from the charge in the potential well of the floating diffusion node, while keeping the compressed signal separate from the linear signal, and the compressed signal being a non-linear function of the detected signal; and summing the linear signal and a linearized version of the compressed signal and performing a
(Continued)

non-linear conversion on the summation signal to fit the imaging device's output range.

16 Claims, 12 Drawing Sheets

(51) Int. Cl.
    *H04N 5/355*     (2011.01)
    *H04N 5/361*     (2011.01)
    *H04N 5/357*     (2011.01)

(52) U.S. Cl.
    CPC ......... *H04N 5/35527* (2013.01); *H04N 5/361* (2013.01); *H04N 5/378* (2013.01)

(56) References Cited

U.S. PATENT DOCUMENTS

| | | | |
|---|---|---|---|
| 7,920,193 | B2 | 4/2011 | Ladd et al. |
| 2003/0136915 | A1 | 7/2003 | Wany |
| 2008/0218619 | A1* | 9/2008 | Egawa .................. H04N 5/243 348/296 |
| 2008/0252762 | A1* | 10/2008 | Iwamoto ............ H04N 5/35518 348/301 |
| 2009/0021627 | A1 | 1/2009 | Fossum |
| 2009/0101796 | A1 | 4/2009 | Ladd et al. |
| 2010/0224765 | A1 | 9/2010 | Seitz et al. |
| 2011/0221944 | A1 | 9/2011 | Deschamps |

OTHER PUBLICATIONS

Extended European Search Report for corresponding European Application No. 13195391.1, dated Mar. 18, 2014.
Hertel et. al., "An Adaptive Multiple-Reset CMOS Wide Dynamic Range Imager for Automotive Vision Applications," 2008 IEEE Intelligent Vehicles Symposium, Jun. 4-6, 2008, pp. 614-619.
International Search Report for corresponding International PCT Application No. PCT/EP2014/076283, dated Mar. 11, 2015.

* cited by examiner

METHOD FOR IMAGE NOISE REDUCTION AND IMAGE DEVICE

FIELD OF THE INVENTION

The present invention is generally related to the field of image sensors, and more in particular to high dynamic range image sensors.

BACKGROUND OF THE INVENTION

The recent advances in CMOS sensor image (CIS) technology have allowed manufacturing of the high resolution image sensors which usually also contain basic image processing functions on the same chip as the image sensor array itself.

The most utilized sensing elements of today's CMOS image sensors comprise a pinned photodiode, a transfer gate, a floating diffusion, a reset gate, a source follower gate and a row select switch. These devices are usually referred to as 4T pixels (four transistor pixels). They combine the advantages of CCD image sensors of low noise and high sensitivity with the advantages of high integration provided by the CMOS technology. While 4T pixels excel in low signal range the physical limitations of the photodiode and floating diffusion limit the maximum achievable signal to a rather moderate value.

The average 4T pixel floating diffusion capacitance is in the range of several fF what typically translates into roughly 10000 electrons full well capacity. The dynamic range of the image sensor is defined as the ratio of the highest non-saturating signal to the noise in the absence of optical excitation. The typical 4T pixel dark noise is in the range of several electrons, thus the maximum dynamic range of a 4T pixel is usually limited to 60-70 dB.

The dynamic range of the imaged scenes can be quite high. The ability to discriminate objects in a high dynamic range scene is especially important in automotive driving assistance applications. A typical night driving scene would require a dynamic range of more than 100 dB to capture the dark and the bright details. Other examples of high dynamic scene can be a car entering a dark garage or a tunnel in the bright day.

Numerous approaches for dynamic range extension have been proposed in the prior art. A non-exhaustive list includes multiple frame recombination, autoreset pixel (U.S. Pat. No. 6,927,796), logarithmic response pixel (US2003/136915), multiple integration potential well pixel (US2009/021627), partial reset approaches (e.g. U.S. Pat. No. 7,586,523 and US2011/221944).

The proposed approaches for the image sensor dynamic range extension however have significant drawbacks: the multiple frame approaches suffer from high image lag and require a full frame buffer and a powerful processing unit to merge the low dynamic range frames into a high dynamic range image, the autoreset and multiple integration potential well pixels achieve the dynamic range extension at the price of more complex pixel circuitry, so killing the possibility to build practical high resolution image sensors.

The logarithmic response pixel described in US2003/136915 suffers from poor dark signal performance due to the usage of an n+–p substrate diode and high technological pixel to pixel mismatch of the non-linear elements resulting in a high fixed pattern noise of the wide dynamic range image. The per-pixel calibration is required to bring the noise to acceptable levels in practice. Yet another approach, e.g. described in US 2010/0224765, makes use of a non-linear device connected to the floating diffusion to preserve the low light performance of the 4T pinned diode pixels. The signal charge after filling the photodiode potential well leaks to the floating diffusion potential well and creates a highly non-linear voltage drop on the sublinear element connected to it. Another logarithmic response pixel is disclosed in US2008/0252762: the pixel signal readout is split into 2 phases of reading out the first linear signal and the second nonlinear signal caused by the nonlinear logarithmic voltage drop over a potential barrier. While potentially these last two approaches are capable of achieving a quite high saturation point and have the same low light noise as the linear 4T pinned diode, the pixel medium and high light noise performance of such imagers is bad due to the uncertainty in the potential at which the signal charge starts to leak to the photodiode and also due to technological mismatch of the non-linear elements. In practice it also requires quite high computational power to perform per-pixel calibration.

The most successful approach for extending the dynamic range relies on the use of partial resets of the integration node during integration time. The method described in the landmark paper "*A 256×256 CMOS Imaging Array with Wide Dynamic Range Pixels and Column-Parallel Digital Out*" (Decker et al., IEEE JSSC, 33(12), 1998, pp. 2081-2091) yields a good dynamic range extension, but suffers from high image lag and poor dark performance since an n+–p substrate photodiode is used as a sensing element. One could try replacing the n+–p substrate sensing element with a pinned diode and use the transfer gate to apply partial resets, but a straightforward application of this approach to the 4T pixel with a pinned photodiode does not lead to acceptable results in practice, since the contemporary technology has a lot of variance in the pinned photodiode depletion potential, pinned photodiode capacitance and also in the transfer gate barrier potential, what leads to unacceptably high fixed pattern noise of the high dynamic range image. Another possible alternative could be applying the partial reset signal to the floating diffusion node. In this case the temporal noise performance of the 4T pixel would be lost if the transfer gate is fully open. If the transfer gate is partially open (like in the approach presented in the above mentioned paper by Decker et al., the case where an overflow gate is used) so that a charge can leak from the photodiode to the floating diffusion, the temporal noise performance of the 4T pixel in low light can be preserved, but the variation of the potential at which the leakage occurs will introduce significant fixed pattern noise to the medium light and high light signal. The resulting uncertainties of the pixel response make the colour reconstruction especially difficult requiring per pixel calibration, which is usually not an acceptable solution for high volume embedded applications.

Several dynamic range extension methods have been proposed to tackle the high fixed pattern noise issue of the 4T pixel operating in dynamic range extension mode using a partial reset approach. The method described in U.S. Pat. No. 7,586,523 and in EP1924085 suggests a partial reset being applied to the photodiode potential well together with an additional partial readout, which will separately sample the signal above the partial reset level. The method described in U.S. Pat. No. 7,920,193 suggests a partial reset together with per-pixel knee point calibration. While the mentioned approaches reduce the impact of the pinned photodiode depletion potential variation and the transfer gate barrier potential variation, they have a drawback of applying partial resets to the photodiode potential well sacrificing part of the swing of the linear signal to the compressed signal. The available voltage range for partial reset is also limited, making it quite difficult in practice to achieve a high dynamic range extension. Another significant drawback of the mentioned approaches is the fact that contemporary technologies have high mismatch of the photodiode capacitance leading to high fixed pattern noise of the high dynamic range image.

Another drawback of the proposed approaches is a steep transition from linear signal to a highly compressed signal. As shown in "*An adaptive multiple-reset CMOS wide dynamic range imager for automotive vision applications*" (D. Hertel et al., IEEE Intelligent vehicles symposium 2008, June 2008, pp. 614-619) a custom tailored response function with gradual response slope change is highly advantageous in wide dynamic range imaging, the incremental signal to noise ratio should be optimized in the whole dynamic range to get the best detection capability of the high dynamic range imaging system. A simple one or two knee point response of the pixel does not satisfy the requirements of many applications like, for example, automotive driver assistance systems.

Hence, there is a need for a solution for operating a 4T pixel device which enables acquisition of high dynamic range scenes while maintaining a low fixed pattern noise level across the whole dynamic range and which preserves the 4T pinned diode pixel dark performance.

SUMMARY OF THE INVENTION

It is an object of embodiments of the present invention to provide for a method for noise reduction in an imaging device, wherein fixed pattern noise is properly dealt with.

The above objective is accomplished by the solution according to the present invention.

In a first aspect the invention relates to a method for noise reduction in an imaging device comprising a 4T pixel in operation, said 4T pixel comprising a pinned photodiode and a floating diffusion node, said 4T pixel being fed from a supply source, said photodiode having a potential well capacity lower than the potential well capacity of the floating diffusion node so that, once the photodiode potential well is full, photo-electrons can leak from the photodiode potential well into the potential well of the floating diffusion node, said photodiode potential well and said potential well of said floating diffusion node being separated by a transfer gate potential barrier. The method comprises the steps of detecting a signal impinging on the 4T pixel of the imaging device and integrating the charge of said detected signal simultaneously in said photodiode potential well and said potential well of said floating diffusion node, whereby the floating diffusion node has charge leakage into the supply source, so that, while integrating the charge a non-linear relation exists between charge in the potential well of the floating diffusion node and the total amount of charge flowing into the potential well of the floating diffusion node, deriving a linear signal proportional to the detected signal from the charge in the photodiode potential well, deriving a compressed signal from the charge in the potential well of the floating diffusion node, while keeping said compressed signal separate from said linear signal, said compressed signal being a non-linear function of the detected signal, summing the linear signal and a linearized version of the compressed signal and performing a non-linear conversion on the summation signal to fit the imaging device's output range.

The proposed solution indeed allows for noise reduction in the imaging device. The noise present in an imaging device operating in high dynamic range mode is typically temporal noise and noise coming from the photodiode well capacity variation. In order to achieve a noise reduction the proposed technique applies non-linear transformations in the signal processing pipeline to attenuate the noise stemming from the photodiode capacity variation. The pinned 4T pixel is engineered or biased in a way that the photodiode potential well capacity is smaller than the floating diffusion potential well capacity and a path is provided for the charge to overflow from the photodiode to the floating diffusion once the photodiode potential well is full. A well-defined non-linear charge leakage from the floating diffusion node to the supply source during integration time is provided. More in particular, from the signal captured by the 4T pinned photodiode pixel, a first signal is determined from the charge in the photodiode potential well, said first signal being proportional to the detected signal. From the charge in the potential well of the floating diffusion node a second, non-linear compressed signal is determined. The two signals are next combined by making a summation of the first, linear signal and a linearized version of the second, compressed signal. The resulting summation signal is then converted in a non-linear way so that it fits the output range of the imaging device.

In a preferred embodiment the method also comprises a step of performing a blending of the linear signal and the non-linearly converted summation signal. The blending step helps to preserve the low light temporal noise performance of the 4T pinned photodiode pixel and it also reduces the dip in SNR in the transition region.

In another preferred embodiment a thresholding is performed on the linear signal and on the non-linearly converted summation signal. This helps to preserve the low light temporal noise performance of the 4T pinned photodiode pixel.

In an advantageous embodiment the non-linear function of the detected signal results from at least one partial reset of the floating diffusion node. The method then preferably comprises a step of applying a partial reset to the floating diffusion node during the integration period.

In one embodiment the non-linear function is represented by a piecewise linear approximation resulting from applying at least one partial reset pulse to the floating diffusion node.

In another embodiment the linear signal is combined with a photodiode dark current signal and the compressed signal is combined with a floating diffusion dark signal before performing said summing.

Advantageously, the step of deriving the linear signal comprises a scaling. In a preferred embodiment the scaled linear signal is then applied for compensating the responsivity of the floating diffusion node.

In another preferred embodiment the linearized version of said compressed signal is obtained by performing a knee point location estimation. This estimation involves:

assuming an unknown knee point location for a frame of an imaged scene, introducing at least one variation on the assumed knee point location in at least one other frame of said imaged scene, computing a histogram for each frame, computing at least one histogram difference and at least one histogram sum, determining an estimate of the knee point location as the point where the ratio of the histogram difference and the histogram sum changes sign.

In another aspect the invention relates to an imaging device comprising a 4T pixel, said 4T pixel comprising a pinned photodiode and a floating diffusion node, said 4T pixel arranged for being fed from a supply source, said photodiode having a potential well capacity lower than the potential well capacity of said floating diffusion node so that, once said photodiode potential well is full, photo-electrons can leak from said photodiode potential well into said potential well of said floating diffusion node, said photodiode potential well and said potential well of said floating diffusion node being separated by a transfer gate potential barrier, said imaging device comprising means for detecting a signal impinging on said 4T pixel for integrating the charge of said detected signal simultaneously in said photodiode potential well and said potential well of said floating diffusion node, whereby said floating diffusion node has charge leakage into said supply source, so that, while integrating said charge a non-linear relation exists between charge in said potential well of said floating diffusion node and the total amount of charge flowing into said potential well of the said floating diffusion node, means for deriving a linear signal proportional to said detected signal from said charge in said photodiode potential well and for deriving a compressed signal from said charge in said potential well of said floating diffusion node, while keeping said compressed signal separate from said linear signal, said compressed signal being a non-linear function of said detected signal, combining means for summing said linear signal and said linearized version of said compressed signal and for performing a non-linear conversion on the summation signal to fit said imaging device's output range.

In a preferred embodiment the imaging device is further arranged for real time estimation of a partial reset potential barrier height of the 4T pixel, by discharging the floating diffusion node to a low potential, applying a partial reset followed by sampling of the floating diffusion node, resetting the floating diffusion node and sampling a reset value of the floating diffusion node, whereby an estimation of the partial reset potential barrier height is obtained from the difference between the sampled value of the floating diffusion node and said reset value. The partial reset barrier height information is needed to further reduce the impact of the technological process variation on the pixel response curve. This information can be also used to accurately synthetize the required pixel response using the computation means of the imaging device.

In another embodiment the imaging device is arranged for real time estimation of the potential well capacity of the photodiode, by discharging the photodiode to a low potential, putting the transfer gate into a default state being the same as during the integration phase, resetting the floating diffusion node and sampling a reset value of the floating diffusion node, transferring charge from the photodiode to the floating diffusion node and sampling the floating diffusion node, whereby an estimation of the potential well capacity of the photodiode is obtained from the difference between the sampled value of the floating diffusion node and the reset value. Information about the actual potential well capacity of the photodiode can be used by the imaging device to adjust the photodiode potential well capacity to its optimal value avoiding the negative impact of the technological process variations.

In one embodiment the imaging device is arranged for real time estimation of the potential well capacity of the photodiode, by filtering the linear signal and estimating the potential well capacity of the photodiode by averaging values of the filtered linear signal. This embodiment provides an advantage of extracting the estimation of the photodiode potential well capacity directly from the operating pixel array without a need for additional measurement circuitry.

In one embodiment the imaging device comprises a controller arranged for receiving an estimation of the photodiode potential well capacity and a target value of the photodiode potential well capacity and for generating a bias signal for the transfer gate. In this way the impact can be reduced of the technological shifts on the photodiode potential well capacity variation.

Preferably the imaging device comprises filtering means for filtering the linear signal and processing means arranged for estimating the ratio between the responsivity of the photodiode to the responsivity of the floating diffusion node based on the filtered linear signal.

In one embodiment the linear signal and the compressed signal are represented with 12 bits and said summation signal with 12 bits plus one overflow bit.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figures 1A, 1B:
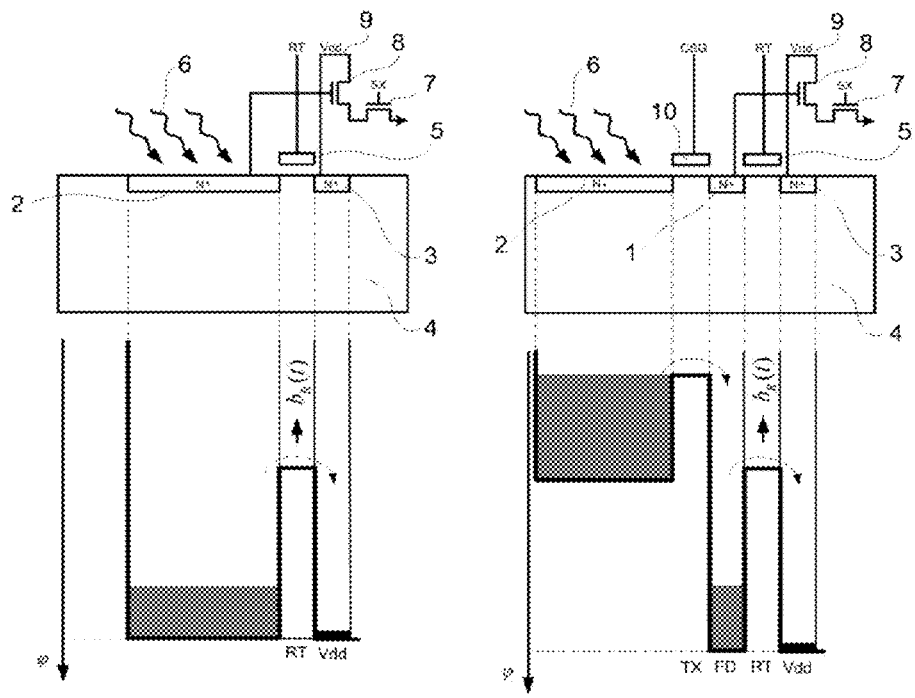
FIG. 1a illustrates a conventional 3T pixel and FIG. 1b a 3T pixel with a charge spill gate. The corresponding electrostatic potential diagrams are shown as well.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The solution for operating the 4T pixel proposed in this invention preserves the benefits of both the 3T pixel architecture (being well controlled high dynamic pixel response) and the 4T pinned pixel architecture (namely low noise), while avoiding their drawbacks (high temporal noise of the 3T pixel and high fixed pattern noise due to technology variation of the photodiode depletion potential of the 4T pixel).

Figure 2:
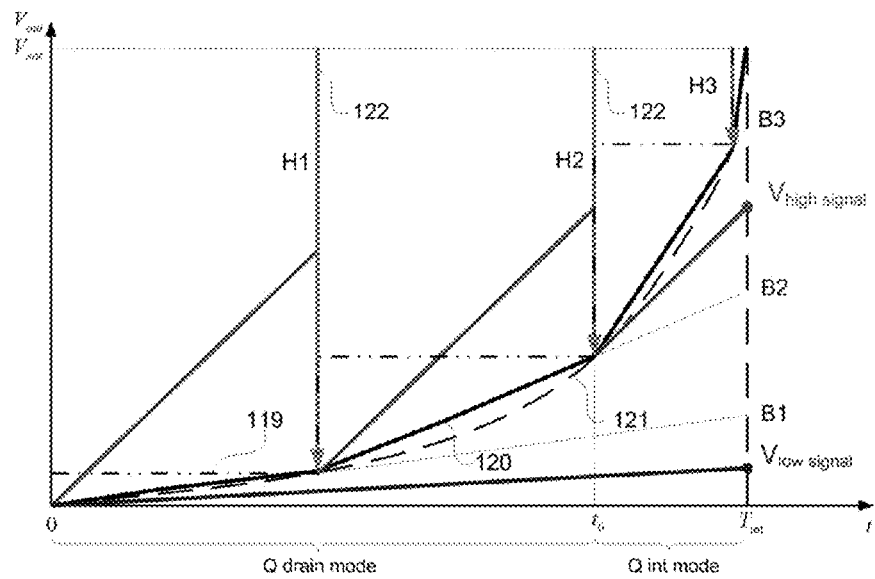
FIG. 2 illustrates a 3T pixel partial reset.

The well-known structure of a conventional 3T (three transistor) pixel, along with the corresponding electrostatic potential diagram, is shown in FIG. 1*a*. It contains a sensitive node (n+–p substrate photodiode) (2), a reset gate (5), a source follower transistor (8) and a row select switch (7) located in the substrate (4). The pixel is supplied with a voltage source of magnitude Vdd (9,3). FIG. 1*b* shows another possible implementation of a similar active pixel with a charge spill gate (10) attached to the photodiode sensitive node (2). The implementation shown in FIG. 1*b* has the advantage over the implementation shown in FIG. 1*a* of a higher charge to voltage conversion gain. The charge after filling the photodiode potential well can overflow into the low capacitive charge integration floating diffusion node (1) where the charge to voltage conversion occurs. Apart from this difference the operation of both pixel implementations is rather similar and they are referred to as '3T pixel' in the rest of this description. The above-mentioned paper by Decker et al. describes the idea of operating the above-mentioned 3T pixels with partial reset of the charge integrating node which is either the photodiode node (2) for the implementation shown in FIG. 1*a* or a charge sense node (1) for the implementation shown in FIG. 1*b*. As illustrated in FIG. 2, during the integration the reset (RT) gate potential barrier height is changed according to some predefined monotonously decreasing function of time $b_R(t)$ (121), which is defined as a difference between the reset gate potential barrier height and the initial potential of the charge integrating node. If the charge integrating node potential is higher than the reset potential barrier, the charge integrating node potential is unaffected. If the charge integrating node potential is lower than the reset potential barrier, the node is partially reset to the height of the reset potential barrier. If the rate of change of $b_R(t)$ is lower than the rate of change of the signal in the integrating node, the charge is leaking to the supply voltage and the signal on the photodiode follows $b_R(t)$. Once the rate of change of $b_R(t)$ is equal to the rate of change of the signal, the leakage to the pixel supply stops and the signal continues a linear discharge of the integration capacitor. The $b_R(t)$ function can be in general a smooth function of time but for convenience of implementation and easier linearization the $b_R(t)$ can be also approximated (120) using a multiple step function (119) or a series of standalone pulses (122). The pulse or step of height Hx creates a knee point on the response curve at point Bx. The knee point positions of the 3T pixel are rather well defined since the barrier heights are defined only by the voltage difference between the reset and the partial reset. The technological variation of the reset gate threshold value has no significant impact since the variation contributes the same offset to the reset potential and the partial reset potential and it is cancelled during the pseudo correlated double sampling (CDS) at the readout.

Figure 3:
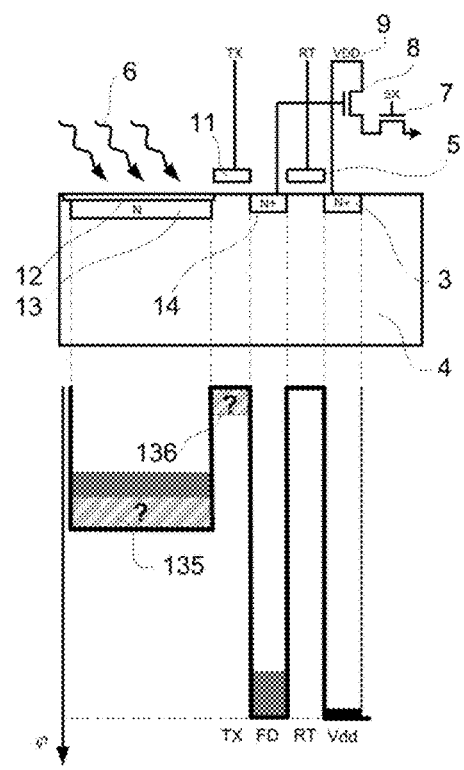
FIG. 3 illustrates a 4T pixel.
Figure 4:
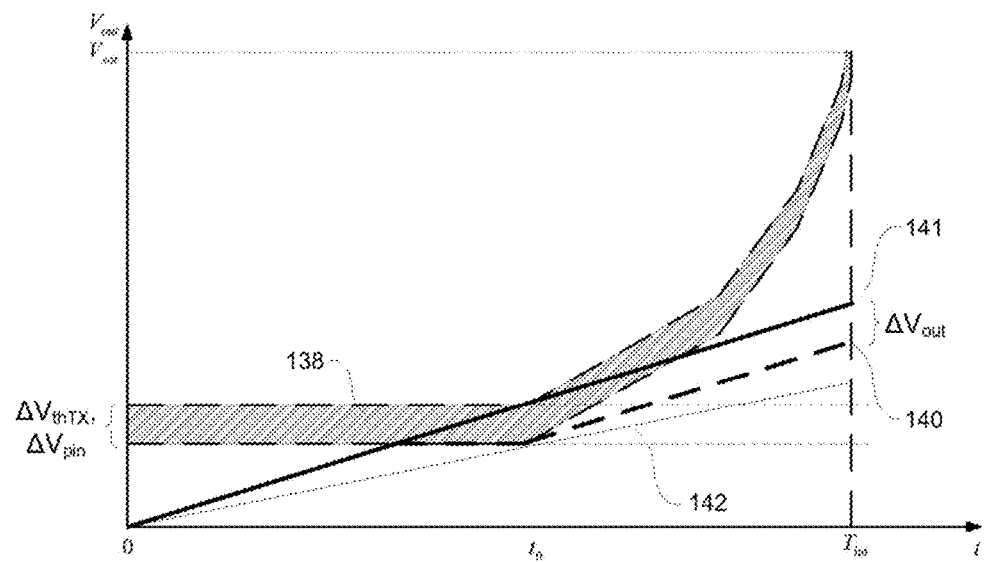
FIG. 4 illustrates the impact of the 4T technological variance on the high dynamic range (HDR) performance.
Figure 5:
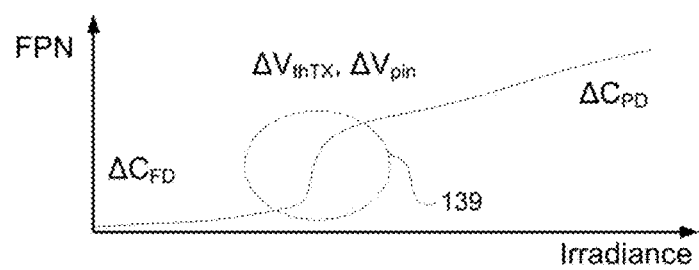
FIG. 5 illustrates fixed pattern noise of a 4T pixel in HDR mode using partial resets of the photodiode potential well.

FIG. 3 shows a scheme of a 4T pixel. A 4T pixel comprises a pinned photodiode comprising an n doped region 13 and a pinning layer 12, a floating diffusion (14), a transfer gate (TX) (11), reset gate (RT) (5), selection gate (SX) (7) and source-follower readout transistor (8). Compared to the 3T pixel a transfer gate, the floating diffusion node and the pinned photodiode have been added. The operation of the pinned photodiode of the 4T pixel relies on the full charge transfer from the photodiode node to the floating diffusion node during the reset and readout phases which can occur if the full depletion of the photodiode node happens. The potential of the full depletion of the photodiode is defined by the applied technology and is not well controlled, resulting in an uncertainty 135. At the same time the transfer gate threshold voltage also has a technological variation 136. As can be seen from FIG. 4 the barrier height variation directly translates into noise for the signals that are high enough to be affected by the partial reset. If the partial reset is applied to the photodiode node the depletion potential uncertainty and the transfer gate threshold voltage uncertainty add up, resulting in the potential uncertainty 138. For low intensity signals below 142 the fixed pattern noise is mainly defined by the variation of the photodiode responsivity and the floating diffusion capacitance which is much lower than the uncertainty 138. For higher signals when the partial reset affects the amount of electrons in the photodiode potential well the fixed pattern noise gets a steep rise (139 in FIG. 5). For example the signal depicted in FIG. 4 can take either trajectory 140 or trajectory 141 with an error $\Delta V_{out} = \Delta V_{TX} + \Delta V_{PIN}$. As irradiance increases further the fixed pattern noise also increases, mainly due to the photodiode capacitance mismatch. Even if the steep rise in fixed pattern noise 139 in FIG. 5 can be reduced by techniques as described in U.S. Pat. No. 7,586,523 or U.S. Pat. No. 7,920,193, the image quality will have a significant deterioration because of photodiode capacitance mismatch.

In the present invention several measures are taken in order to avoid a fixed pattern noise increase stemming from the technological pixel to pixel variation of the full depletion potential, photodiode capacitance and the threshold voltage of the transfer gate. The pinned 4T pixel is engineered or biased in a way that the photodiode potential well capacity is smaller than the floating diffusion potential well capacity and a path is provided for the charge to overflow from the photodiode to the floating diffusion once the photodiode potential well is full. Potential well capacity is defined here as the amount of charge storable in the potential well, at which signal saturation occurs. A well-defined non-linear charge leakage from the floating diffusion node to the supply source during integration time is provided by a partial reset function of time $b_R(t)$ using the reset gate. The linear signal from the photodiode and the non-linear compressed signal from the floating diffusion are read out. Finally, a non-linear recombination algorithm, which is a key part of the current invention, is applied to these two signals to achieve superior noise (temporal and fixed pattern) performance over the current prior art.

Figure 6:
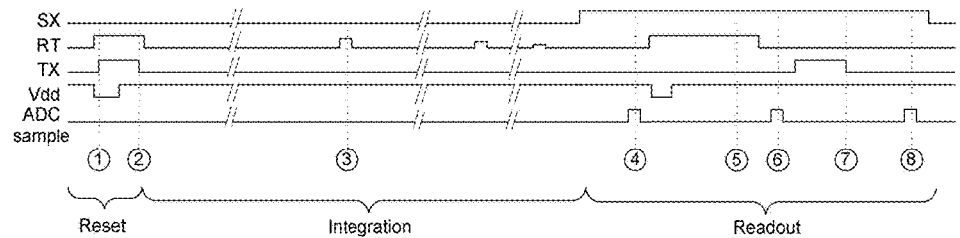
FIG. 6 represents a timing diagram.

An implementation of pixel operation timing is shown in FIG. 6. The operation can be logically subdivided into four phases:

reset phase
integration phase
readout phase
processing phase

Figure 7:
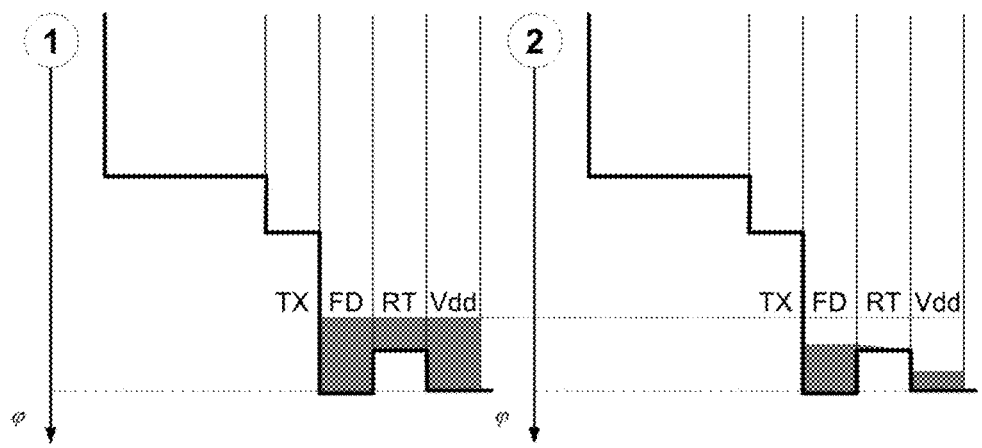
FIG. 7 illustrates the reset phase potential diagrams at points 1 and 2 indicated in FIG. 6.

During the reset phase the photodiode gets fully depleted and the floating diffusion potential is initialized to a high value. The particular system implementation of which a timing diagram is shown in FIG. 6, benefits from lowering the pixel supply voltage below the reset gate potential barrier height while the reset gate and the transfer gate are in a conducting state. When the supply voltage is below the reset barrier, the floating diffusion voltage is totally defined by the supply voltage (FIG. 7, where the 1 corresponds to time instant 1 in FIG. 6). The advantage of introducing this extra step to the reset phase is in destroying the memory effect from the previous frame (thus avoiding the image lag artefact) and providing a right initial point for the next reset sub-phase. When the supply voltage gets restored to its nominal value, the charge leaks over the reset gate to the supply voltage source until the potential on the floating diffusion is approximately equal to the reset gate potential barrier height (FIG. 7, point 2 corresponding to reference 2 of FIG. 6). At this moment the initial point for charge integration is set. After the reset gate and transfer gate voltages go down to their default states, the integration phase begins.

The system can also benefit from other reset techniques like control signal boosting above the pixel supply level. Also a conventional reset approach can be used whereby an RT pulse is applied together with a TX pulse.

Figure 8:
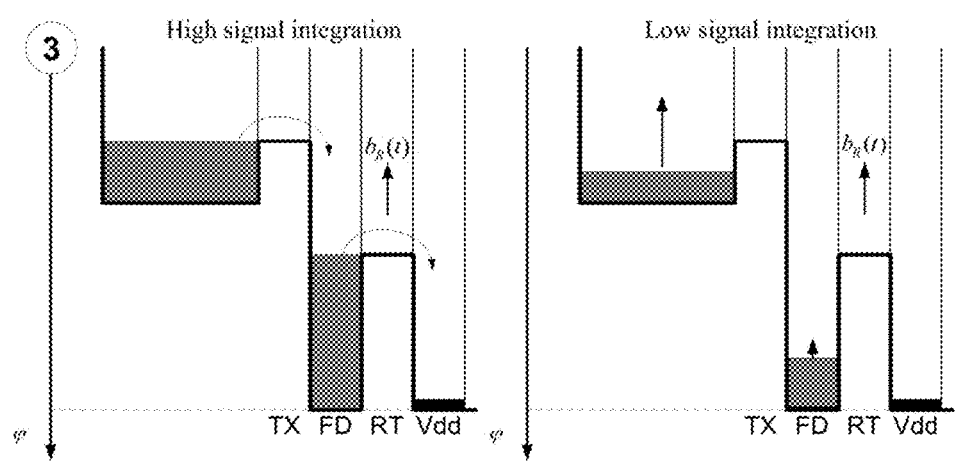
FIG. 8 illustrates the integration phase potential diagram at point 3 in FIG. 6.

During the integration phase the photo electrons start to accumulate in the photodiode potential well. Once it is full, the photo electrons overflow into the floating diffusion potential well (FIG. 8, for time instant 3). During the integration phase a partial reset function $b_R(t)$ is applied to the floating diffusion potential well by varying the reset (RT) gate voltage. The function $b_R(t)$ quite accurately follows the voltage applied to the reset transistor gate minus the reset gate reset voltage applied during the reset phase. The second order effects of the threshold voltage drift as a function of source voltage appear to be of no significant importance in practice and their mean impact can be compensated using a reset gate barrier measurement system or performing a per-chip characterization.

The timing diagram shown in FIG. 6 contains a series of reset pulses of decreasing amplitude that define the function $b_R(t)$. Such pulse series can be adjusted to get a piecewise linear approximation of some arbitrary response function. In other embodiments of the invention the function $b_R(t)$ can be defined by a stepped function or by any monotonously decreasing voltage signal. In yet another embodiment the pulse series can be applied together with another analogous pulse series applied to the transfer gate to minimize the parasitic capacitive disturbance of the photodiode node. In yet another embodiment of the current invention no partial resets are applied to achieve up to 6 dB dynamic range extension.

During the integration phase the parasitic diode of the floating diffusion is also collecting some portion of the photo electrons. This is an undesired signal, since it does not contribute to the pixel's sensitivity in darkness but rather increases the sensitivity under high illumination. An additional post-processing step may be required to compensate for the possible non-linearity. The floating diffusion sensitivity is minimized by properly adjusting the technology parameters and physical layout of the pixel.

Figure 9:
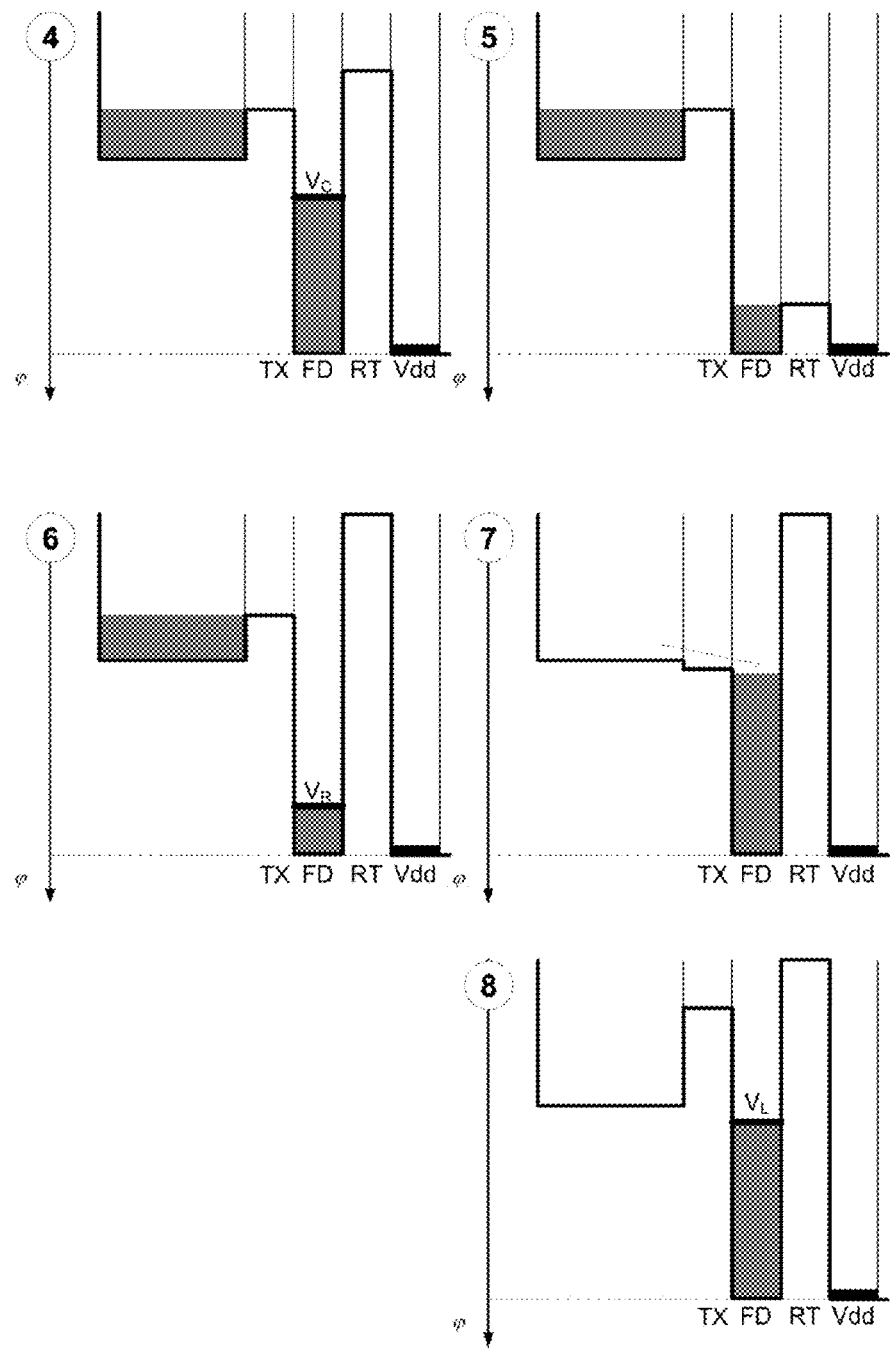
FIG. 9 illustrates readout phase potential diagrams for points 4-8 shown in FIG. 6.

The corresponding potential diagrams at time instants 4 to 8 of FIG. 6 are shown in FIG. 9. Unlike the operation of a conventional pinned 4T pixel the readout according to the present invention contains three samplings of the pixel output. At the end of the integration period the floating diffusion voltage is sampled. After resetting the floating diffusion in the same way as during the reset phase the voltage of the floating diffusion is sampled again. The difference between the second and the first sample represents the floating diffusion non-linear compressed signal $V_{FD}$. Depending on the actual implementation of the readout circuitry the same reset value might be sampled twice to allow the analog correlated double samplings of the linear and compressed signals. After transferring the charge from the photodiode by applying a voltage pulse to the transfer gate the pixel output is sampled again. The difference between the reset sample and the last sample represents the photodiode linear signal $V_{PD}$.

After the readout stage the two sampled photodiode and floating diffusion signals contain a high amount of noise coming from the technological pixel to pixel variation of the full depletion potential, photodiode capacitance and the threshold voltage of the transfer gate. Since this noise is correlated, it can be cancelled by applying an appropriate algorithm. The algorithm which allows cancellation of the fixed pattern noise of the linear and compressed signals is one of the key features of the current invention.

In one possible approach the fixed pattern noise coming from the technological pixel to pixel variation of the full depletion potential and of the transfer gate threshold voltage is cancelled by an addition of the photodiode signal and the floating diffusion signal. This occurs until the floating diffusion signal is linear (i.e. no charge is leaked from floating diffusion over the reset gate to the supply). However, as soon as the floating diffusion signal dependency on the irradiance is not linear anymore, the high fixed pattern noise appears in the region where the compressed signal departs from a linear response. This happens because the reset potential barrier function $b_R(t)$ is well defined with reference to the floating diffusion reset value. In case of simple addition the whole reference system of the barrier function $b_R(t)$ gets a random offset, which is determined by the technological pixel to pixel variation of the full depletion potential and of the transfer gate threshold voltage. Therefore the point at which the response bending occurs, has the same uncertainty as the uncertainty of the technological pixel to pixel variation of the full depletion potential and of the transfer gate threshold voltage. This results in a very high amount of fixed pattern noise in the compressed part of the high dynamic pixel response. The fixed pattern noise of the summed signal has a similar steep rise as the one (139) shown in FIG. 5. Thus, there is a need for a smart algorithm for estimation of pixel irradiance operating on both photodiode and floating diffusion signals that is not sensitive to the variation of the photodiode potential well capacity when signal dependent charge leakage from the floating diffusion occurs.

Figure 10:
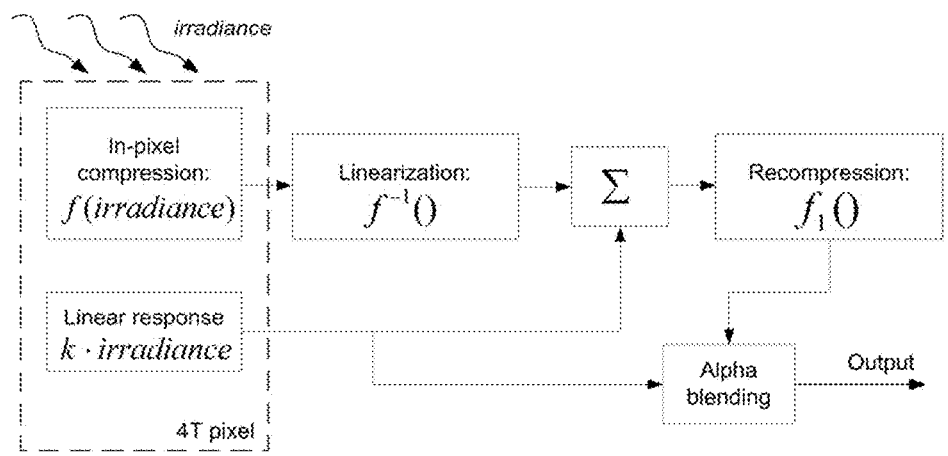
FIG. 10 illustrates an embodiment of the algorithm for Fixed Pattern Noise (FPN) reduction.

The present invention relates in one aspect to an algorithm that minimizes the impact of the technological pixel to pixel variation of the full depletion potential and of the transfer gate threshold voltage and of the photodiode capacitance mismatch. The proposed algorithm capitalizes on the use of transformations on both the photodiode and floating diffusion signals, which shift the fixed pattern noise to the signal range where it is attenuated by the non-linear pixel response. The barrier function $b_R(t)$ uniquely defines the shape of the non-linear response curve $f(Q)$ of the floating diffusion signal. In the description below $f(Q)$ is referred to as a compression function. If the 4T pixel is operated according to the description above, the pixel to pixel variation of $b_R(t)$ and $f(Q)$ is negligibly small compared to the pixel to pixel variation of photodiode depletion potential and the threshold voltage of the transfer gate. A block diagram of an embodiment of the proposed algorithm is shown in FIG. 10. Mathematically, the core algorithm can be expressed as:

$$Q_\Sigma = f_1(Q_{PD} + f^{-1}(Q_{FD})), \qquad (1)$$

or in the voltage domain $$V_\Sigma = f_1(V_{PD} + f^{-1}(V_{FD})) \qquad (2)$$

where $f^{-1}$ is the inverse function to the compression function $f$, $V_{FD}$ the floating diffusion signal (the difference between the sampled value after integration and the reset value) and $V_{PD}$ the photodiode signal (the difference between the sampled value after charge transfer from the photodiode and the reset value). In the general case $f_1$ can be a function different from $f$. In a preferred embodiment $f_1 \equiv f$ so the equation 2 translates into:

$$V_\Sigma = f(V_{PD} + f^{-1}(V_{FD})) \qquad (3)$$

The output range of the signal $V_\Sigma$ can be logically subdivided into three regions:

1) small signal: there is only linear part of the signal, no charge leaked to the floating diffusion node;
2) medium signal: photo charge leaked to the floating diffusion but no charge leaked to the pixel supply source; both the photodiode signal and the floating diffusion signals contain the noise from variation of the photodiode potential well capacity; $f(V_{PD} + f^{-1}(V_{FD})) = f(V_{PD} + V_{FD})$; the noise coming from photodiode potential well capacity variation is fully cancelled; the output signal is already affected by $f$
3) high signal: photo charge leaked from the floating diffusion node into the pixel supply source, noise stemming from partial reset potential barrier variation (it is low relatively to the noise stemming from the variation of the photodiode potential well capacity) appears in the sum $V_{PD} + f^{-1}(V_{FD})$ but it is strongly attenuated by $f(\ )$.

The algorithm results in an accurately defined pixel response function with highly attenuated fixed pattern noise, in contrast to simple addition or threshold algorithms where the noise from the photodiode potential well capacity variation propagates to the output signal in the high signal region or around the threshold point.

Figure 11:
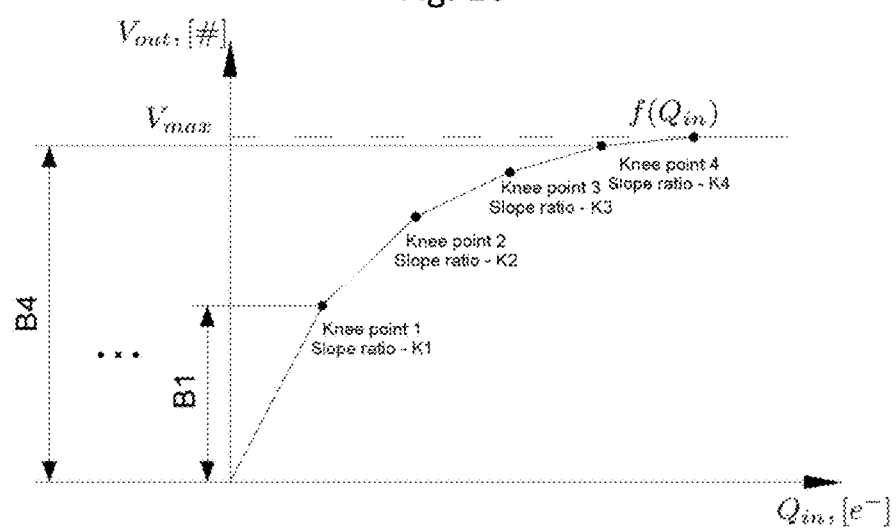
FIG. 11 illustrates a piecewise linear approximation of a compression function.

In a general case the hardware and software implementation of the compression function $f$ and the inverse compression function $f^{-1}$ is rather resource demanding. In one embodiment of the present invention a piecewise linear approximation of $f$ is used. Its compression function is shown in FIG. 11. The implementation of equation 2 for a piecewise linear approximation of $f$ is much simpler, but it still, in general case, requires a wide bus multiply-add block to prevent quantization errors.

Figure 12:
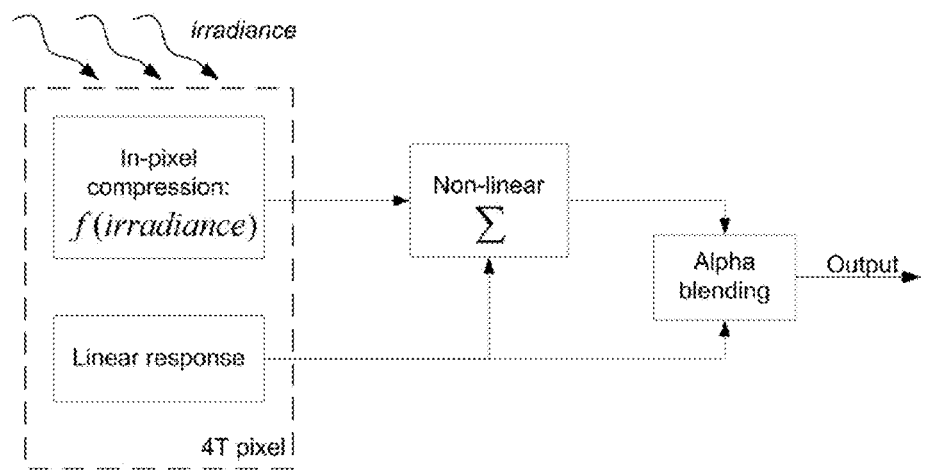
FIG. 12 illustrates another embodiment of the algorithm for FPN reduction.

Another embodiment of the algorithm is represented in FIG. 12. Instead of calculating the inverse function $f^{-1}$ the addition operation is performed in a way that the shape of the function $f$ is taken into account and this "non-linear addition" operation produces essentially the same result as equation 3.

The present invention also relates to an optimized hardware implementation of the photodiode and floating diffusion signals. Instead of direct implementation of equation 3 the current invention proposes a non-linear addition operation for the piecewise linearization case, which produces the same result as a direct implementation of equation 3.

Figure 13:
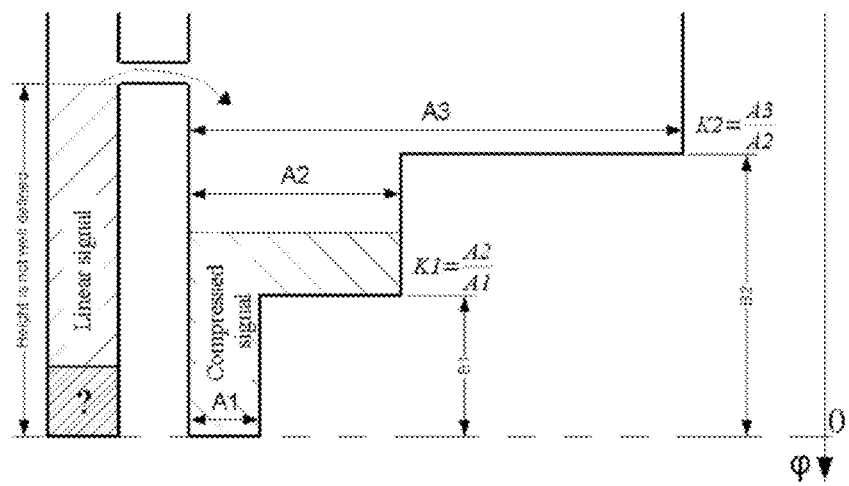
FIG. 13 illustrates the water tank physical analogy to 4T overflow pixel compression.

The non-linear addition operation is best understood using a water tank physical analogy to the 4T overflow pixel, as illustrated in FIG. 13 where a water tank models the potential well capacitance, liquid corresponds to charge and the water level is the voltage that is read out from the pixel. The 'non-linear' floating diffusion potential well can be represented by a water tank with a stepped variable width A1, A2, A3 where each step increase corresponds to a knee point. The output signal is the water level in the 'non-linear' tank after the linear signal is "poured" into it.

Figure 14:
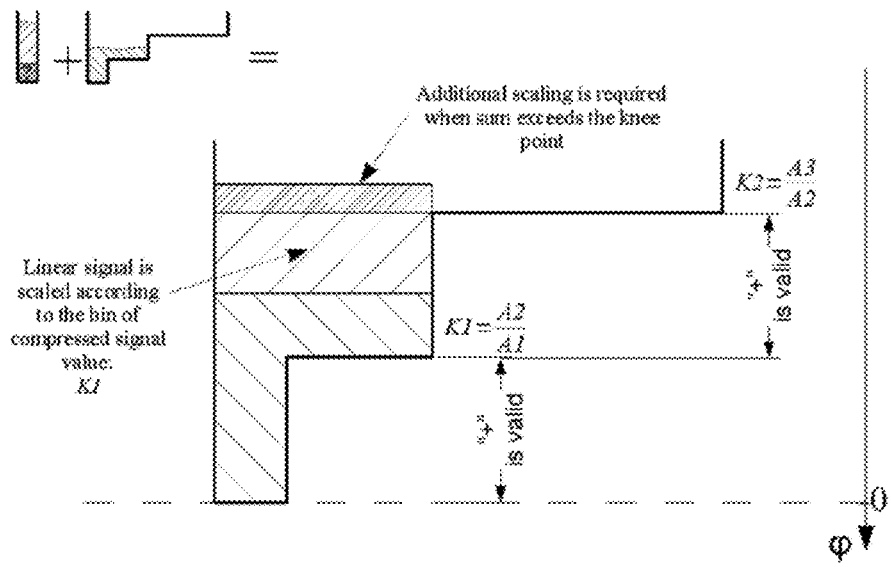
FIG. 14 and FIG. 15 illustrate, in two parts, a non-linear addition.
Figure 15:
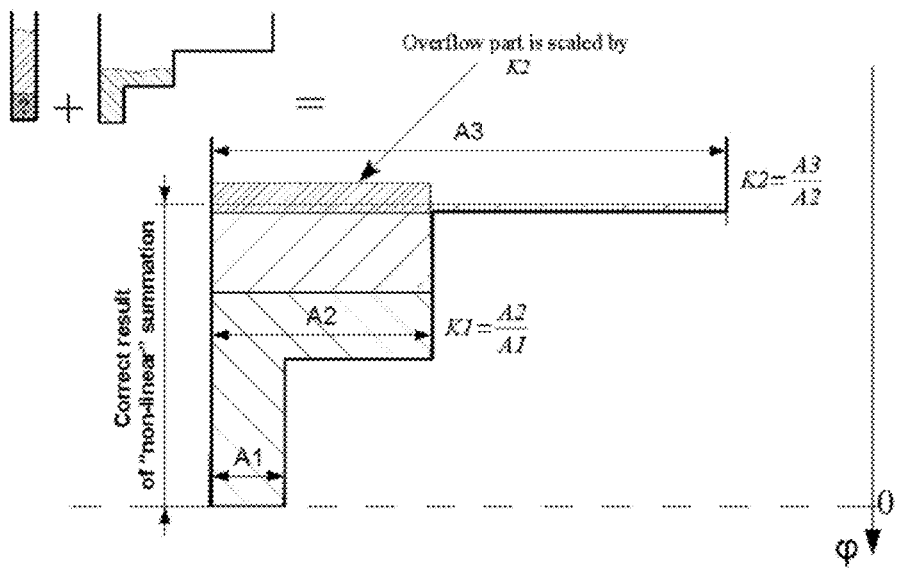

The knee point, as before, is characterized by two parameters: the knee height and the slope ratio. The slope ratio in the water tank model is the ratio of the tank widths $$K1 = \frac{A2}{A1}, K2 = \frac{A3}{A2},$$

the knee height is the step height $B_1, B_2, \ldots, B_n$. When a linear signal component is added to the non-linear tank, it raises the water level by an amount depending on where the water level is in the non-linear floating diffusion (FD) tank. If the water level increases above the knee point, it spills over larger area causing a lower rate of increase in the water level. FIG. 14 and FIG. 15 depict the case when the FD tank level is between the first and the second knee and the linear signal is large enough to spill over the first knee.

The "pouring" of the linear signal into the non-linear FD tank can be expressed using the following sequence:
1. Assuming knee height is growing with its index, the knee height $B_i$ right below the FD signal level is found.
2. The linear signal level $S_L$ is scaled by a coefficient $k = \Pi_0^i K_j$
3. A linear summation of the scaled linear signal $S_L$ and the FD signal $S_{FD}$ is executed $S = S_L \cdot k + S_{FD}$
4. If the resulting level S is higher than the next knee height $B_{i+1}$, the overflowed part $S - B_{i+1}$ is scaled by the $K_{i+1}: S = B_{i+1} + (S - B_{i+1}) \cdot K_{i+1}$
5. Step 4 is repeated for the rest of the barriers (i is incremented each iteration)
6. S is the result of the non-linear summation.

Figure 16:
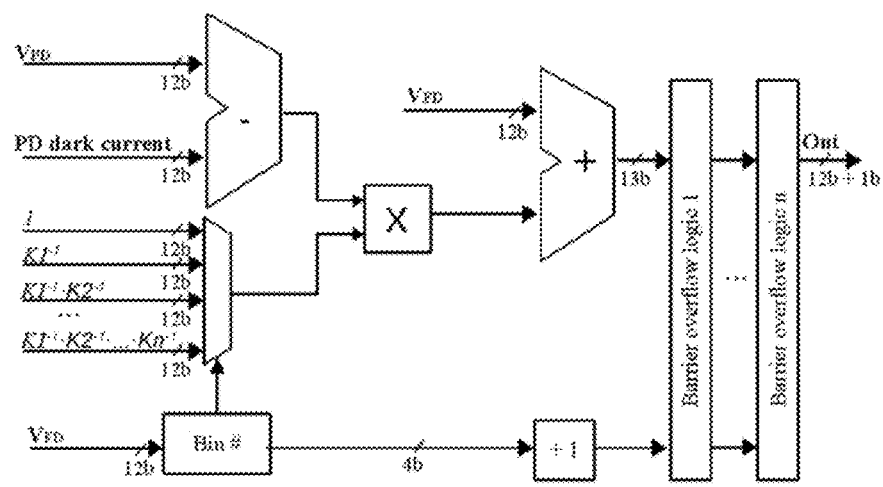
FIG. 16 illustrates the first stage of the non-linear addition hardware implementation.
Figure 17:
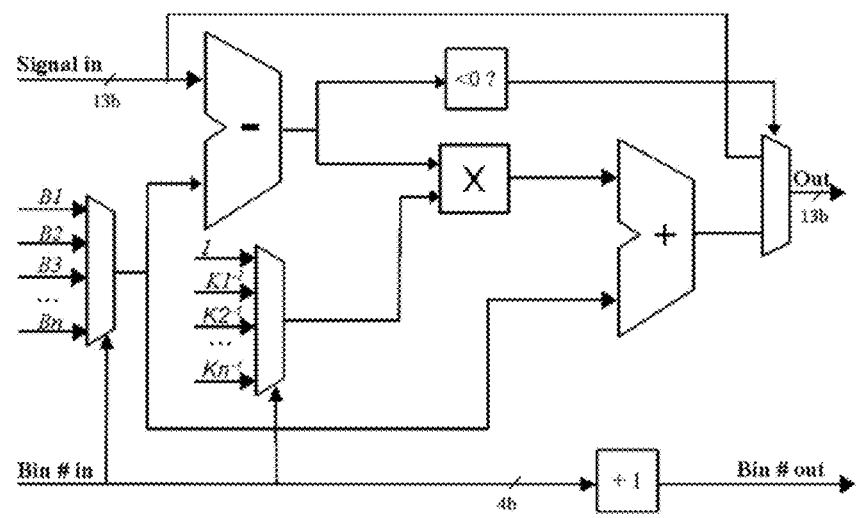
FIG. 17 illustrates the barrier overflow logic of the non-linear addition hardware implementation.

A hardware implementation block diagram is depicted in FIG. 16 and FIG. 17. The first stage of non-linear addition block implements steps 1-2 of the above sequence. It expects a 12 bit linear photodiode signal, a 12 bit compressed floating diffusion signal, a 12 bit dark current compensation value and a vector of the 12 bit scaling constants:

$$k_i = \begin{bmatrix} 1 \\ K1^{-1} \\ K1^{-1} \cdot K2^{-1} \\ \vdots \\ K1^{-1} \cdot K2^{-1} \cdot \ldots \cdot Kn^{-1} \end{bmatrix} \quad (4)$$

The vector $k_i$ is totally defined by the compression function $f$ and can thus be pre-computed. The value of each element in $k_i$ is expected to be less or equal to 1, since the barriers can be used for compression only (not for amplification). That means that the signal after the adder in FIG. 16 cannot be larger than 13 bits. This condition gives a possibility to have a 13 bit wide bus for the signal that goes into the barrier overflow block without loss of precision when reducing the circuit size. Additionally a floating diffusion dark current compensation feature can be integrated into the first stage of the non-linear adder block.

The following barrier overflow stages have the same implementation. They perform steps 4-5 of the sequence explaining the "pouring" of the linear signal into the non-linear FD tank. They expect a 13 bit signal from the preceding stages, with index i indicating the knee point which is right below the signal and two constant 12 bit vectors:

$$K_i = \begin{bmatrix} 1 \\ K1^{-1} \\ K2^{-1} \\ \vdots \\ Kn^{-1} \end{bmatrix}, B_i = \begin{bmatrix} 1 \\ B1 \\ B2 \\ \vdots \\ Bn \end{bmatrix} \quad (5)$$

As in the case with the first stage each element in the constant vector $K_i$ is less or equal to 1, thus the output signal of each stage should be less than the input signal. It means that a 13 bit wide bus can be used for the signal. Since there is no feedback from the following stages, they can be easily pipelined. The output of the whole non-linear adder block is a 12 bit sum and 1 overflow bit.

The signal at the output of the non-linear adder block or the result of equation 2 contains temporal noise and dark signal non-uniformity noise from the compressed signal. Thus one of the main advantages of the 4T pixel is lost at this stage. The pixel signal after the non-linear adder $Q_\Sigma$ for small signals can be expressed as $$Q_\Sigma = Q_{PD} + Q_{FD} + q_{FDnoise} \quad (6)$$

where $Q_{PD}$ denotes the photodiode linear signal charge (voltage difference between the reset and the last sample multiplied with the floating diffusion capacitance), $Q_{FD}$ the floating diffusion signal charge (voltage difference between the reset and the first sample multiplied with the floating diffusion capacitance) and $q_{FDnoise}$ the temporal and fixed pattern noise of the floating diffusion signal.

Figure 18:
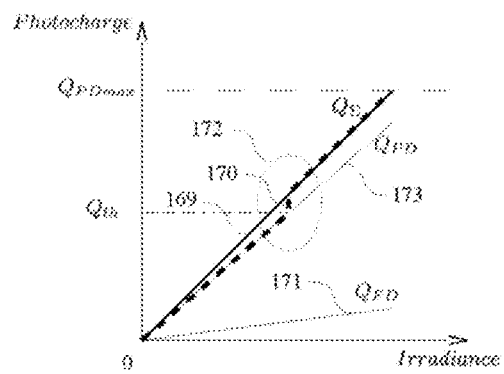
FIG. 18 illustrates the floating diffusion parasitic responsivity.

The most straightforward way to avoid the noise problem would be to use a simple threshold algorithm: if the photodiode linear signal 173 is less than a threshold value $Q_{th}$ than the photodiode signal is used as a pixel signal alone (the non-linear adder is bypassed), if the photodiode signal is greater than $Q_{th}$, the sum of the photodiode signal and floating diffusion signal is used as a pixel output signal (the non-linear adder output is used). The resulting pixel response 170 is shown in FIG. 18 with a dashed line.

There is a step 172 in the pixel response at the transition point from a pure photodiode linear signal to the non-linear adder output because of the non-zero floating diffusion responsivity and floating diffusion dark current. As a result there is a spike in fixed pattern noise 180 near $Q_{th}$ and a dip in signal to noise ratio (FIG. 19) what potentially can cause failures in machine vision algorithms.

In the present invention the extra responsivity of the floating diffusion is compensated by introducing a scaling coefficient to the photodiode signal. If the ratio between the photodiode responsivity and the floating diffusion responsivity is $$\gamma = \frac{Q_{FD}}{Q_{PD}},$$

the corrected photodiode signal can be expressed as $$Q_{PDcorrected} = Q_{PD} \cdot (\gamma + 1) \quad (7)$$

The corrected photodiode signal has the same slope as $Q_\Sigma$ on average. In practice the remaining error in $\gamma$ and pixel to pixel mismatch of the $\gamma$ coefficient still causes a spike 182 in the fixed pattern noise near $Q_{th}$, although its magnitude would be much smaller comparing to the spike from simple threshold algorithm 180.

Figure 20:
FIG. 20 illustrates a block diagram of the real time floating diffusion parasitic responsivity correction coefficient estimation algorithm.

One of the aspects of the current invention is real time estimation of the $\gamma$ coefficient which can have drifts over technological process and temperature. This can be accomplished by analysing the pixels' signals in real time: those with small photodiode signal would have the right data to estimate the correct $\gamma$. For the pixels satisfying the criteria $\gamma$ is calculated and an averaging filter (e.g. moving average) is applied to the filtered pixels set to improve the estimation accuracy. The algorithm diagram is shown in FIG. 20.

To improve the system further one embodiment of the current invention introduces a smooth transition from the predicted signal to the summed signal. If $\alpha$ is defined as some function of the photodiode signal being monotonically increasing function from 0 to 1 over some predefined range $(Q_{th1}, Q_{th2})$, $Q_{th2} > Q_{th1}$ the resulting pixel output signal can be expressed as:

$$Q_{out} = Q_{PDcorrected} \cdot (1 - \alpha(Q_{PD})) + Q_\Sigma \cdot \alpha(Q_{PD}) \quad (8)$$

Figure 19:
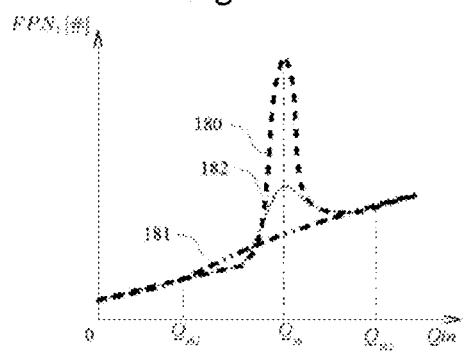
FIG. 19 illustrates an FPN spike due to the floating diffusion parasitic responsivity and the effect of alpha blending.

This operation should smear the fixed pattern noise (FPN) spike 182 over a range of the input signal $(Q_{th1}, Q_{th2})$ making it much less pronounced (181, FIG. 19). The described blending algorithm can also produce acceptable results if it is implemented without the parasitic floating diffusion responsivity correction coefficient $\gamma$.

Figure 21:
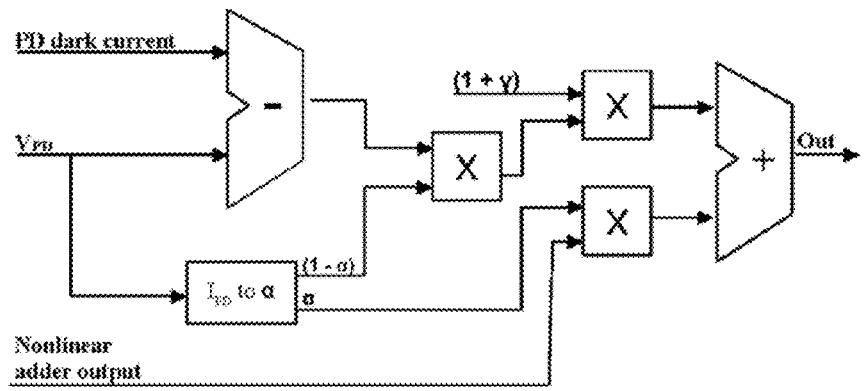
FIG. 21 illustrates an embodiment of the hardware implementation of the alpha blending algorithm.

A hardware implementation of one of the embodiments of the alpha blending algorithm of the present invention is shown in FIG. 21. The implementation has also a dark current correction operation for the photodiode linear signal, this information about the photodiode dark current should be available in the system from light shielded pixels which can be placed around the perimeter of the sensitive array.

The current invention also relates to an algorithm for estimation of the average of the partial reset potential barrier height. The method of operating the image sensor as described above provides quite low pixel to pixel variation of the partial reset function $b_R(t)$. However, due to the technological shifts the second order effects such as e.g. reset gate threshold voltage dependency on the source voltage can create significant device to device variations of $b_R(t)$. Such errors may, for example, lead to an incorrect interpretation of colour information. Therefore it is crucial to provide the actual information about $b_R(t)$ to the image processing system. The partial reset potential barrier measurement system provides direct measurements of $b_R(t)$ at selected points. For the case of stepped or pulsed shape of $b_R(t)$ a number of measurements equal to the number of steps or pulses is required. This information can be delivered to the image processing system either embedded in the image data stream or via a separate low speed communication channel.

The partial reset potential barrier measurement system comprises at least one 4T pixel (preferably light shielded but it can be also a pixel from the sensitive array), a controller capable of generating 4T pixel operation timings and also lowering the pixel's supply voltage below its nominal value and means to read out and filter the reset barrier height information.

Figure 22:
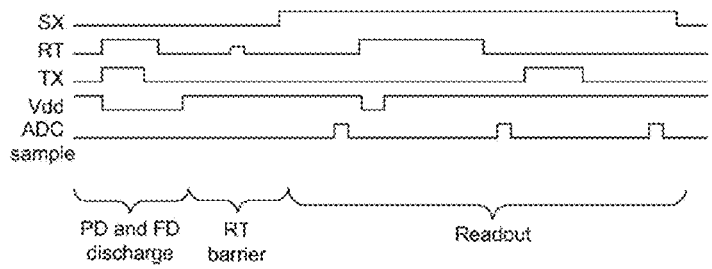
FIG. 22 illustrates an operating timing diagram of the reset potential barrier height measurement system.

The typical operation timing diagram of the reset barrier height measurement system is shown in FIG. 22. During the first phase the pixel supply voltage is lowered to a value close to zero and the reset and transfer gates are set to conducting phase so that the floating diffusion node and photo diode node is filled with electrons. During the second phase the reset and transfer gates are set to the default non-conducting state and the supply voltage is set back to its nominal value. During the third phase a reset gate potential barrier is applied by applying a voltage pulse of height X. The electrons leak to the supply voltage until the floating diffusion potential equals the reset gate potential barrier height. During the fourth phase the floating diffusion signal Y and the photodiode signal $R_{TX}$ are read out using conventional 4T pixel readout timing and X and Y data is outputted. The Y data is preferably is averaged over a set of pixels operating in the partial reset potential barrier height measurement mode described in this paragraph. After the cycle is complete a new cycle for a different magnitude of the reset gate voltage pulse X can be started. The $H_{TX}$ value can be also used as the estimation of the photodiode potential well capacity.

Yet another aspect of the current invention relates to a method for estimating the key linearization parameters, i.e. slope ratio and knee point location. This method is applicable to any imager with a piecewise linear response which allows programmable location of the knee points connecting the piecewise linear segments.

A slope ratio is solely defined by the potential barrier timing and, thus, can be accurately estimated. The knee point location estimation is challenging since the knee point location is also influenced by the potential barrier height which can vary due to a technological parameter spread, temperature, aging or an amount of current flowing over it. The partial reset potential barrier measurement system described earlier provides means for compensating the reset potential barrier uncertainty due to technological parameter spread, temperature and aging but, in practice, it is rather difficult to compensate for the potential barrier dependency on the amount of current flowing over it. An advantage of the algorithm disclosed here is that it outputs information about a knee point location on the pixel response curve which is exactly the information used for linearization.

Figure 23:
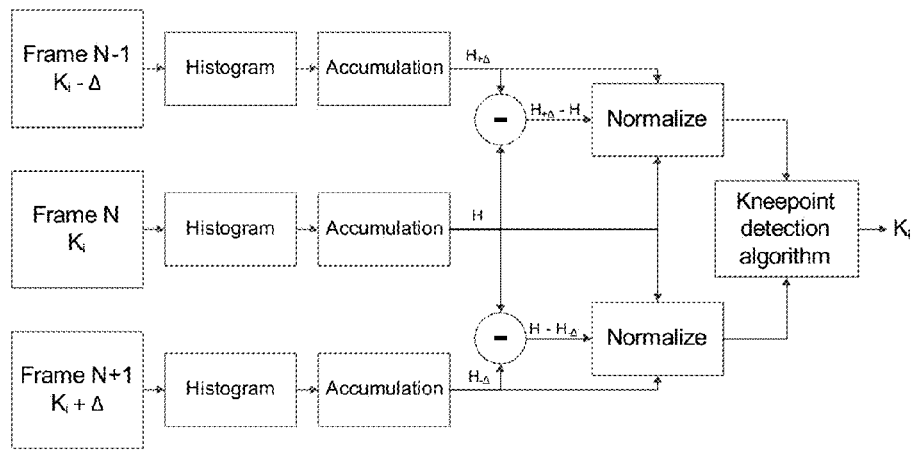
FIG. 23 illustrates a block scheme of an algorithm for estimating linearization parameters.
Figure 24:
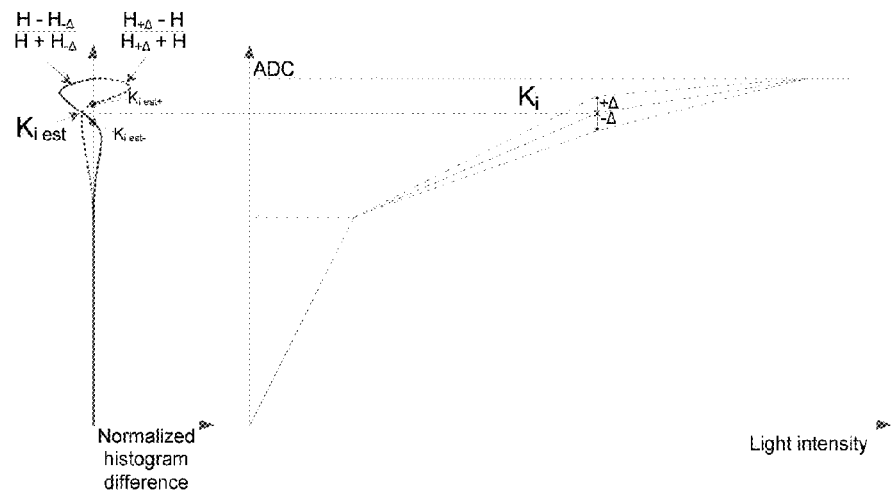
FIG. 24 illustrates the detection of a knee point.

A block diagram of the linearization parameter estimation algorithm is shown in FIG. 23. The algorithm processes the real time image data but the key calculations are done based only on image histograms, which allows for a cheap hardware implementation of the algorithm. The measurement can be initiated when the imaged scene histogram is detected to be wide enough to cover the possible knee point location. Small variations Δ are introduced to the unknown knee point location $K_i$, e.g. by changing the reset potential barrier height, and a number of frame histograms, preferably of three subsequent frames, are passed to an accumulation block. Once the accumulation block has collected a predefined number of summations, the two histogram differences $H_{+\Delta}-H$ and $H-H_{-\Delta}$ are computed and normalized to the corresponding histogram sum $H_{+\Delta}+H$ or $H+H_{-\Delta}$. The typical shapes of the normalized histogram differences and the operation of the knee point detection algorithm is illustrated in FIG. 24. When a small variation $+\Delta$ is introduced to the unknown knee point location $K_i$, the response curve above the knee point becomes slightly more compressive and the response curve below the knee point becomes slightly less compressive, resulting in a dashed normalized histogram difference curve $$\frac{H_{+\Delta} - H}{H_{+\Delta} + H}$$

which changes sign at a point $K_{i\ est+}$. When a small variation $-\Delta$ is introduced to the unknown knee point location $K_i$ the response curve above the knee point becomes slightly less compressive (compared to the case without variation) and the response curve below the knee point becomes slightly more compressive, resulting in a solid normalized histogram difference curve $$\frac{H - H_{-\Delta}}{H + H_{-\Delta}}$$

which changes sign at a point $K_{i\ est-}$ The knee point $K_i$ can be estimated as a point in the middle between $K_{i\ est+}$ and $K_{i\ est-}$:

$$K_i = \frac{K_{iest+} + K_{iest-}}{2}.$$

Only one normalized histogram difference curve can be also used for the knee point position estimation. If the variation Δ is very small the point where the normalized histogram difference curve crosses zero provides a good estimation of the knee point location. The estimated knee point position $K_i$ possibly needs some further correction to account for the peculiarities of the response curve. The correction factor can be estimated during the initial camera calibration. The same principle can be applied for the simultaneous estimation of several knee points.

The scene variations over a long measurement time form a random signal of which the standard deviation increases proportionally to the square root of number of summations. The histogram difference signal in $$\frac{H_{+\Delta} - H}{H_{+\Delta} + H} \text{ or } \frac{H - H_{-\Delta}}{H + H_{-\Delta}}$$

comes from the knee point location variation. It is deterministic and defined by the pixel response shape and knee point location, and, therefore, increases proportionally to the number of summations. By averaging over a sufficient number of frames (e.g. 1000) an acceptable SNR can be achieved for the precise knee point estimation. This averaging is done by the accumulation block. The accumulation block also allows the knee point location variation to be made very small, so that it is not noticeable by the human eye. The required amount of summations by the accumulation block highly depends on the scene temporal variation. To minimize the measurement time the knee point estimation can be performed only when the scene is known to be static.

The calculated knee point location information may be stored in a non-volatile memory, either on chip or off chip, so that at a system power up the initial knee point information is readily available. The linearization parameter estimation algorithm, executed during the runtime, can guarantee tracking of the knee point position drifts due to the operating temperature change and aging of the device.

Yet another aspect of the current invention deals with an algorithm for estimation of the average of the photodiode potential well capacity and adjusting the photodiode capacity to optimal value so that the technological variations are compensated. The photodiode potential well capacity has rather high technological variation since quite a lot parameters influence it: e.g. photodiode depletion potential variation, transfer barrier potential barrier variation, floating diffusion potential well capacity variation. If the photodiode potential well capacity is too big, a photodiode signal saturation in the readout chain can occur and the noise coming from the pixel to pixel variation of the transfer gate potential barrier will be no longer cancelled by the noise reduction algorithm described above. If the photodiode potential well capacity is too small the dynamic range gets reduced. It is important to be able to adjust the photodiode potential well capacity so that it is close to its optimal value which is slightly below the saturation point of the readout chain saturation.

Figure 25:
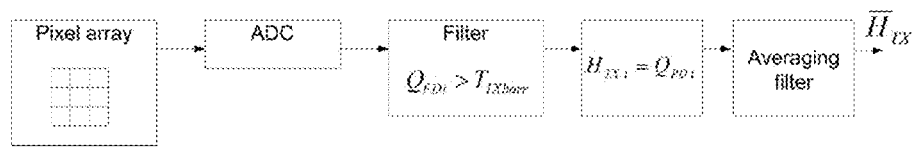
FIG. 25 illustrates a block diagram of the real time photodiode potential well capacity estimation algorithm.

Yet another aspect of the current invention concerns an algorithm for real time estimation of the average photodiode potential well capacity, i.e. the level at which the photodiode signal saturates. This can be accomplished by analysing the pixels' signals in real time: those with high floating diffusion signal would have the right data to estimate the photodiode potential well capacity. For the pixels that satisfy the criteria the photodiode signal is used as the photodiode potential well capacity estimation and an averaging filter (e.g. moving average) is applied to the filtered pixels set to improve the accuracy of the estimation. The block diagram of the algorithm for real time estimation of the average photodiode potential well capacity is shown in FIG. 25.

Figure 26:
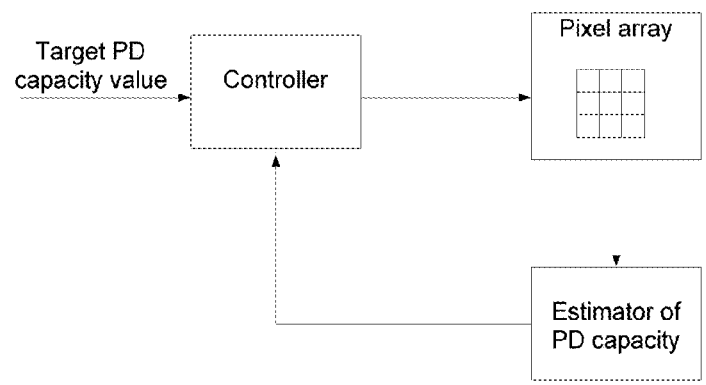
FIG. 26 illustrates a block diagram of a system for generating an optimum bias for the imaging array.

Yet another embodiment of the current invention is a system for generation of an optimum bias for the imaging array. The system implements a closed loop controller which biases the transfer gates of the imaging array so that the photodiode signal swing is maximised while avoiding its saturation in the readout signal path. The block diagram of the particular implementation of closed loop system for generation of an optimum bias for the imaging array is shown in FIG. 26. The estimator block comprises one of the described above approaches for the photodiode potential well capacity estimation. The controller block implements a negative feedback algorithm generating a voltage bias for the transfer gate during the integration phase so that the photodiode well capacity of the 4T pixels in the imaging array is close to the target value.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for noise reduction in an imaging device comprising a 4T pixel in operation, said 4T pixel comprising a pinned photodiode and a floating diffusion node, said 4T pixel being fed from a supply source, said photodiode having a potential well capacity lower than the potential well capacity of said floating diffusion node so that, once said photodiode potential well is full, photo-electrons can leak from said photodiode potential well into said potential well of said floating diffusion node, said photodiode potential well and said potential well of said floating diffusion node being separated by a transfer gate potential barrier, the method comprising:
   detecting a signal impinging on said 4T pixel of said imaging device and integrating the charge of said detected signal in said photodiode potential well;
   integrating, once said photodiode potential well is full, leaking charge in said potential well of said floating diffusion node, whereby said floating diffusion node has charge leakage into said supply source, so that, while integrating said charge a non-linear relation exists between said leaking charge in said potential well of said floating diffusion node and the total amount of charge flowing into said potential well of said floating diffusion node;
   deriving a linear signal proportional to said detected signal from said charge in said photodiode potential well;
   deriving a compressed signal from said charge in said potential well of said floating diffusion node, while keeping said compressed signal separate from said linear signal, said compressed signal being a non-linear function of said detected signal; and
   summing said linear signal and a linearized version of said compressed signal and performing a non-linear conversion on the summation signal to fit said imaging device's output range.

2. The method for noise reduction as in claim 1, comprising performing a blending of said linear signal and said non-linearly converted summation signal.

3. The method for noise reduction as in claim 1, comprising performing a thresholding on said linear signal and on said non-linearly converted summation signal.

4. The method for noise reduction as in claim 1, wherein said non-linear function of said detected signal results from at least one partial reset of said floating diffusion node.

5. The method for noise reduction as in claim 4, comprising applying a partial reset to said floating diffusion node.

6. The method for noise reduction as in claim 1, wherein said non-linear function is represented by a piecewise linear approximation.

7. The method for noise reduction as in claim 1, whereby said linear signal is combined with a photodiode dark current signal and said compressed signal is combined with a floating diffusion dark signal before performing said summing.

8. The method for noise reduction as in claim 1, wherein said deriving of said linear signal comprises a scaling.

9. The method for noise reduction as in claim 8, wherein said scaled linear signal is applied for compensating the responsivity of said floating diffusion node.

10. The method for noise reduction as in claim 1, wherein for obtaining said linearized version of said compressed signal an estimation of a knee point location in said linearized version is performed by:
    assuming an unknown knee point location for a frame of an imaged scene;
    introducing at least one variation on the assumed knee point location in at least one other frame of said imaged scene;
    computing a histogram for each frame;
    computing at least one histogram difference and at least one histogram sum; and
    determining an estimate of the knee point location as the point where the ratio of the histogram difference and the histogram sum changes sign.

11. An imaging device comprising a 4T pixel, said 4T pixel comprising a pinned photodiode and a floating diffusion node, said 4T pixel arranged for being fed from a supply source, said photodiode having a potential well capacity lower than the potential well capacity of said floating diffusion node so that, once said photodiode potential well is full, photo-electrons can leak from said photodiode potential well into said potential well of said floating diffusion node, said photodiode potential well and said potential well of said floating diffusion node being separated by a transfer gate potential barrier, said imaging device comprising:
    means for deriving a linear signal proportional to charge from a detected signal and integrated in said photodiode potential well and for deriving a compressed signal from charge from said detected signal integrated by leakage, once said photodiode potential well is full, in said potential well of said floating diffusion node, while keeping said compressed signal separate from said linear signal, said compressed signal being a non-linear function of said detected signal; and
    combining means for summing said linear signal and said linearized version of said compressed signal and for performing a non-linear conversion on the summation signal to fit said imaging device's output range.

12. The imaging device as in claim 11, arranged for real time estimation of a partial reset potential barrier height of said 4T pixel, by discharging said floating diffusion node, applying a partial reset followed by sampling of said floating diffusion node, resetting said floating diffusion node and sampling a reset value of said floating diffusion node, whereby an estimation of said partial reset potential barrier height is obtained from the difference between the sampled value of said floating diffusion node and said reset value.

13. The imaging device as in claim 11, arranged for real time estimation of the potential well capacity of said photodiode, by discharging said photodiode to a potential lower than the height of said transfer gate potential barrier, putting said transfer gate into a default state, resetting said floating diffusion node and sampling a reset value of said floating diffusion node, transferring charge from said photodiode to said floating diffusion node and sampling said floating diffusion node, whereby an estimation of said potential well capacity of said photodiode is obtained from the difference between the sampled value of said floating diffusion node and said reset value.

14. The imaging device as in claim 13, comprising a controller that receives an estimation of the photodiode potential well capacity and a target value of the photodiode potential well capacity and generates a bias signal for said transfer gate.

15. The imaging device as in claim 11, arranged for real time estimation of the potential well capacity of said photodiode, by filtering said linear signal and estimating the potential well capacity of said photodiode by averaging values of said filtered linear signal.

16. The imaging device as in claim 11, comprising filtering means for filtering said linear signal and processing means arranged for estimating the ratio between the responsivity of said photodiode to the responsivity of said floating diffusion node based on said filtered linear signal.

* * * * *